US008775409B1

(12) United States Patent
Mehta et al.

(10) Patent No.: US 8,775,409 B1
(45) Date of Patent: Jul. 8, 2014

(54) QUERY RANKING BASED ON QUERY CLUSTERING AND CATEGORIZATION

(75) Inventors: Dhruvkaran Mehta, Bangalore (IN); Jignashu Parikh, Bangalore (IN)

(73) Assignee: Google Inc., Mountain View, CA (US)

( * ) Notice: Subject to any disclaimer, the term of this patent is extended or adjusted under 35 U.S.C. 154(b) by 278 days.

(21) Appl. No.: 13/314,652

(22) Filed: Dec. 8, 2011

Related U.S. Application Data

(63) Continuation of application No. 12/434,517, filed on May 1, 2009, now Pat. No. 8,145,623.

(51) Int. Cl.
*G06F 17/30* (2006.01)
(52) U.S. Cl.
USPC .......................................................... 707/713
(58) Field of Classification Search
USPC .......................................... 707/3, 4, 709, 713
See application file for complete search history.

(56) References Cited

U.S. PATENT DOCUMENTS

| 7,523,099 | B1 | | 4/2009 | Egnor et al. | |
| 8,145,623 | B1 | * | 3/2012 | Mehta et al. ................... | 707/713 |
| 2004/0249808 | A1 | * | 12/2004 | Azzam et al. ..................... | 707/4 |
| 2005/0222989 | A1 | * | 10/2005 | Haveliwala et al. .............. | 707/3 |
| 2006/0085741 | A1 | | 4/2006 | Weiner et al. | |
| 2008/0249786 | A1 | * | 10/2008 | Oldham et al. .................... | 705/1 |
| 2010/0169300 | A1 | * | 7/2010 | Liu et al. ....................... | 707/709 |

OTHER PUBLICATIONS

Antezeta Web Marketing—Top Keyword Search Trends in Google, Yahoo, Windows Live and Ask [online], [retrieved on Apr. 30, 2009]. Retrieved from the internet <URL: http://www.antezeta.com/blog/top-keyword-search-trends>, 5 pages.
Ask—About Ask.com: IQ, Top Searches for the Week Ending Jan. 25th [online], [retrieved on Apr. 30, 2009]. Retrieved from the internet <URL: http://web.archive.org/web/20080208082757/http://sp.ask.com/en/docs/iq/iq.shtml>, 2 pages.
Ask—Our Search Top 10's for 2007 [online], [retrieved on Apr. 30, 2009]. Retrieved from the internet <URL: http://blog.ask.com/2007/12/our-search-top.html>, 3 pages.
Google Hot Trends [online], [retrieved on Nov. 10, 2008]. Retrieved from the Internet <URL: http://www.google.com/trends/hottrends>, 1 page.
Google Press Center—What is the Google zeitgeist? [online], [retrieved on Nov. 10, 2008]. Retrieved from the Internet <URL: http://www.google.com/intl/en/press/zeitgeist/index.html>, 1 page.
MSN Search Insider—Microsoft Zeitgeist—Digital Inspiration [online], [retrieved on Apr. 30, 2009]. Retrieved from the internet <URL: http://labnol.blogspot.com/2005/12/msn-search-insider-microsoft-zeitgeist.html>, 1 page.

(Continued)

*Primary Examiner* — Etienne Leroux
(74) *Attorney, Agent, or Firm* — Fish & Richardson P.C.

(57) ABSTRACT

Methods, systems, and apparatus, including computer program products, for query ranking based on query clustering and categorization, are disclosed. In one aspect, search queries are selected and grouped into one or more clusters. A representative query is selected for each cluster. Each cluster is associated with a respective representative category. A rank is assigned to each cluster based on a cluster popularity score of the cluster and a category popularity score of the cluster's representative category. The selected representative queries are presented in order according to the ranks of their respective clusters.

39 Claims, 9 Drawing Sheets

(56) References Cited

OTHER PUBLICATIONS

MSN Search Insider Offers Look at MSN Searches [online], [retrieved on Apr. 30, 2009]. Retrieved from the internet <URL: http://blog.searchenginewatch.com/041115-101550>, 1 page.

Yahoo 2007 Top Trends, Yahoo Press Room [online], [retrieved on Apr. 30, 2009]. Retrieved from the internet <URL: http://yhoo.client.shareholder.com/press/releasedetail.cfm?ReleaseID=279411, 8 pages.

Yahoo Buzzlist Versus Google—ReadWriteWeb [online], [retrieved on Apr. 30, 2009]. Retrieved from the internet <URL: http://www.readwriteweb.com/archives/yahoo_buzzlist_versus_google_trends.php>, 3 pages.

\* cited by examiner

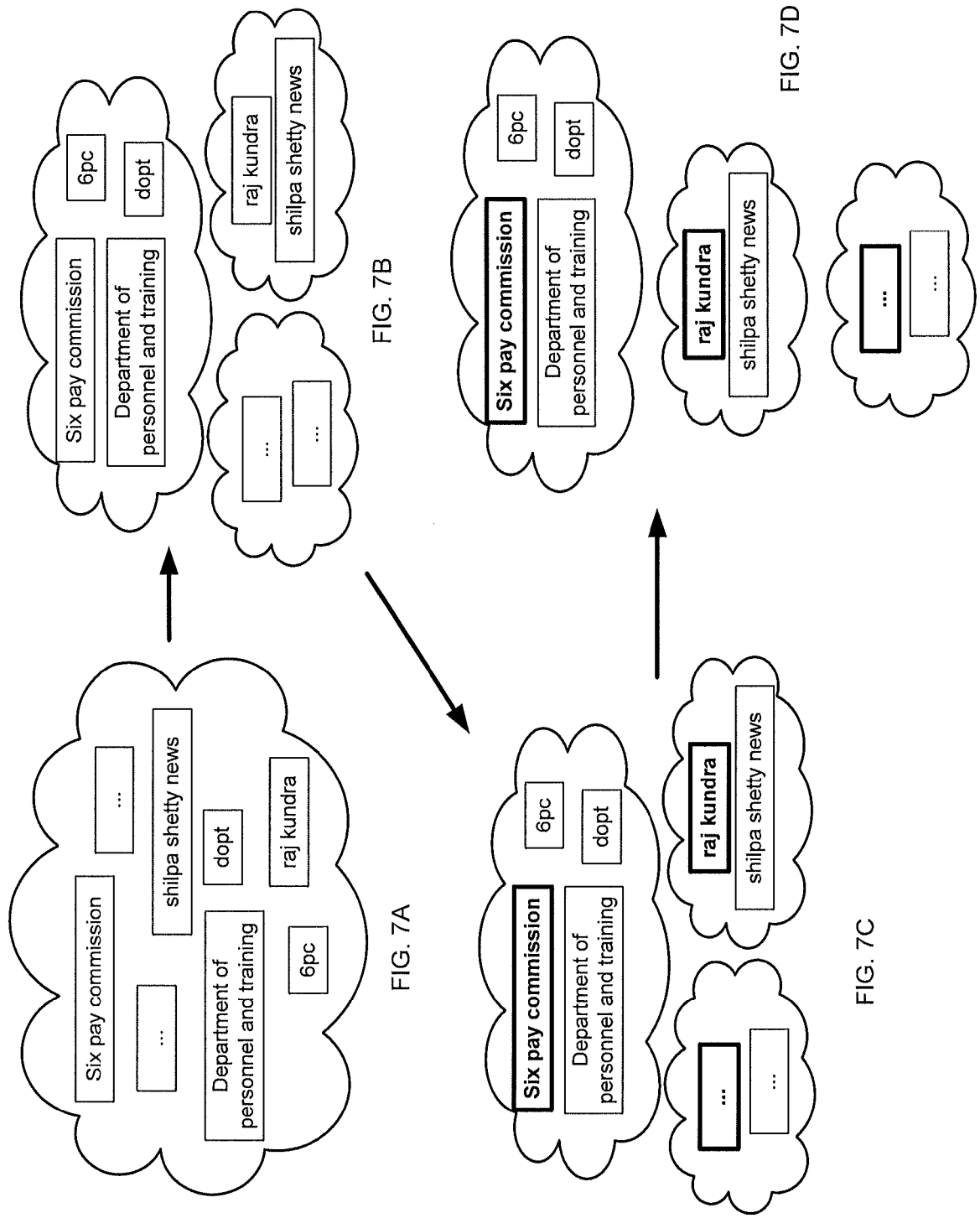

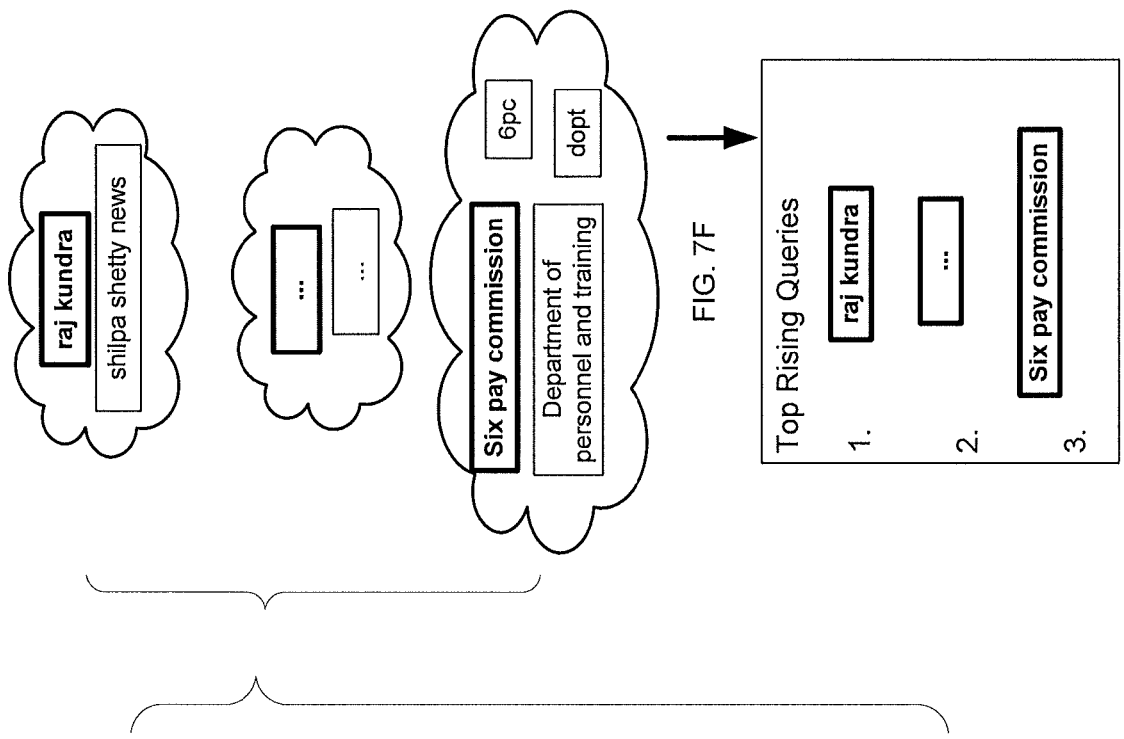
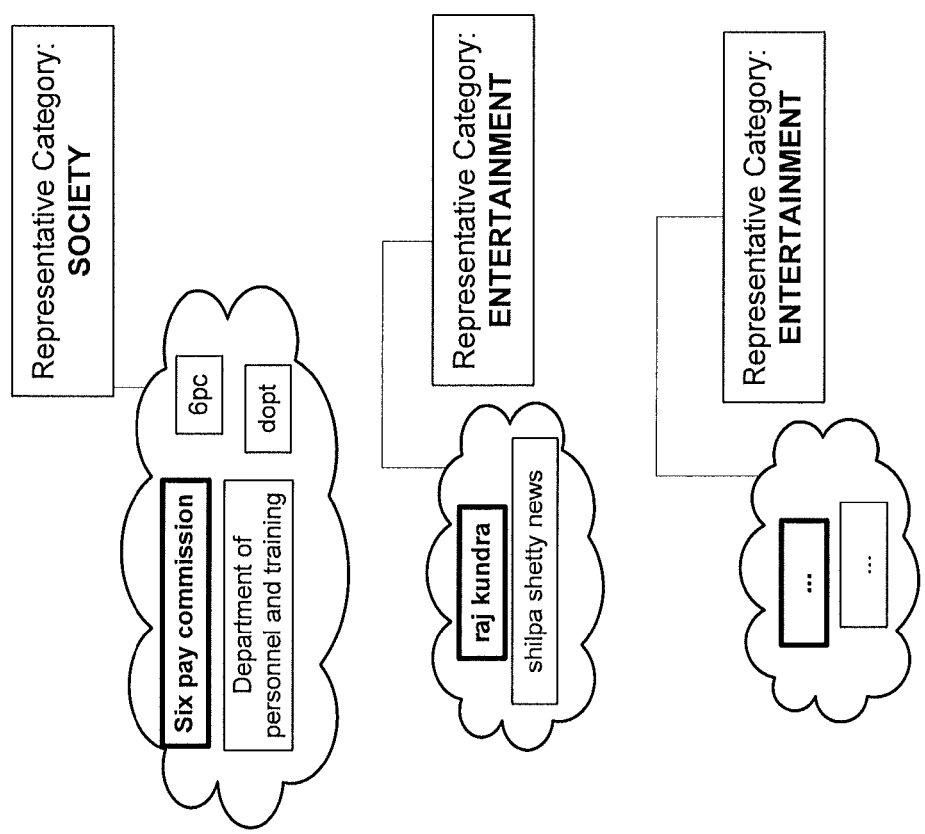

QUERY RANKING BASED ON QUERY CLUSTERING AND CATEGORIZATION

CROSS-REFERENCE TO RELATED APPLICATION

This application is a continuation of U.S. patent application Ser. No. 12/434,517, filed on May 1, 2009, which is herein incorporated by reference in its entirety.

BACKGROUND

This specification relates generally to ranking search queries.

The rise of the Internet has facilitated access to a wide variety of content items, e.g., web pages, images, video content, audio content, electronic games, news articles, and other content. Content items that may be of interest to a user can be identified by a search engine in response to a search query submitted by the user. A search query can include one or more search terms or phrases. In response to receiving a search query, a search engine typically identifies content items responsive to the query, and ranks the content items based on a calculated estimation of how well the content items match the search terms in the search query. The resulting list of content items is then presented to the user.

Search engines commonly have access to query logs that record search queries submitted by many users over time. The total number of times that each search query has been submitted, sometimes referred to as the query's search volume, during a time period can be determined based on the data stored in the query logs. Search queries can be ranked according to their respective search volumes over a period of time. Search queries with the highest search volumes can be presented as the top volume queries for that period of time. Search queries can also be ranked according to the increase in their respective search volumes over a period of time. Search queries with the fastest increase in search volumes can be presented as the top rising queries for that period of time. Top volume queries and top rising queries are often used as indicators of increasing popularity of a topic in a given time period.

SUMMARY

This specification describes technologies relating to query ranking, for example, by query clustering and categorization.

In one aspect, search queries are selected and grouped into one or more clusters. A representative query is selected for each cluster. Each cluster is associated with a respective representative category. A rank is assigned to each cluster based on a cluster popularity score of the cluster and a category popularity score of the cluster's representative category. The selected representative queries are presented in order according to the ranks of their respective clusters.

In some implementations, when grouping the queries into one or more clusters, each search query is assigned to a cluster in a total number of clusters. One of the search queries assigned to each cluster is designated as the cluster center for the cluster. The total number of clusters, assignment of search queries to the clusters, and designation of cluster centers for the clusters are adjusted to minimize an aggregated metric of all search queries, where the metric of a search query is between the search query and the cluster center of the cluster comprising the search query. In some implementations, a plurality of result documents are identified for each of the plurality of search queries, where each search query's respective result documents are responsive to the search query, and the plurality of search queries are grouped based on each search query's respective result documents. In some implementations, a plurality of result Uniform Resource Locators (URLs) are identified for each of the plurality of search queries, where each search queries' respective result URLs are responsive to the search query; and the plurality of search queries are grouped based on each search query's respective result URLs. In some implementations, a plurality of search terms are identified for each of the plurality of search queries; and the plurality of search queries are grouped based on each search query's respective search terms.

In some implementations, the representative query is selected based on a query popularity score for each search query in the cluster, where the query popularity score for a search query is based on a rate of increase in search volume for the search query or a total search volume for the search query. In some implementations, the representative query is selected based on a query performance score, where the query performance score for a search query is based on one or more of a page rank, a click-through rate, a click-through duration, or a click-through reversion rate for a respective result document of the search query, the respective result document being responsive to the search query.

In some implementations, when associating each cluster with the respective representative category, for each cluster: each search query in the cluster is associated with one or more categories based on a respective plurality of result documents responsive to the search query; and the representative category for the cluster is selected based on the category associations of the cluster's search queries.

In some implementations, when selecting the representative category for the cluster, a category from a plurality of categories that is associated with a greatest number of search queries in the cluster is designated as the representative category for the cluster.

In some implementations, when assigning the respective rank to each of the clusters, a rank of at least one cluster is adjusted based on a cluster performance score of the cluster, where the cluster performance score is based on one or more of a page rank, a click-through rate, a click-through duration, or a click-through reversion rate of a respective result document responsive to the cluster's respective representative query.

In some implementations, when presenting representative queries, one or more representative queries are presented in order according to the ranks of their respective clusters, where the one or more representative queries are associated with a common representative category. In some implementations, the total number of representative queries associated with the common representative category does not exceed a pre-determined threshold.

Particular embodiments of the subject matter described in this specification can be implemented to realize one or more of the following advantages. In some implementations, queries targeting similar and related topics are grouped into common clusters. Only one representative query is selected for each cluster of queries and presented to the user. Therefore, the resulting query listing exhibits less redundancy than the query listing showing all queries. In addition, query ranking is adjusted based on the popularity of the queries' associated categories. Thus, the top-ranked queries are more likely to appeal to popular interests. Furthermore, quality indicators, such as page rank, click-through rate, click-through duration, and click-through reversion rate, are used to filter out queries that lead to low quality search results or authoritative sources.

Therefore, only queries that are likely to lead to popular, fresh, and high quality content are presented to the user.

In addition, the query clusters are associated with representative categories, and categorized query listings can be presented. Within each category, the representative queries can be presented in order according to the ranks of their respective clusters. This allows user to view only categories that are particularly popular, or are of particular interest to the user. Furthermore, the number of representative queries presented under each category can be limited to ensure variety when available display area is small.

The details of one or more embodiments of the subject matter described in this specification are set forth in the accompanying drawings and the description below. Other features and advantages of the subject matter will become apparent from the description, the drawings, and the claims.

BRIEF DESCRIPTION OF THE DRAWINGS

FIGS. 7A-7G illustrate an example process of query clustering, representative selection, categorization, ranking, and presentation.

Like reference numbers and designations in the various drawings indicate like elements.

DETAILED DESCRIPTION

Figure 1:
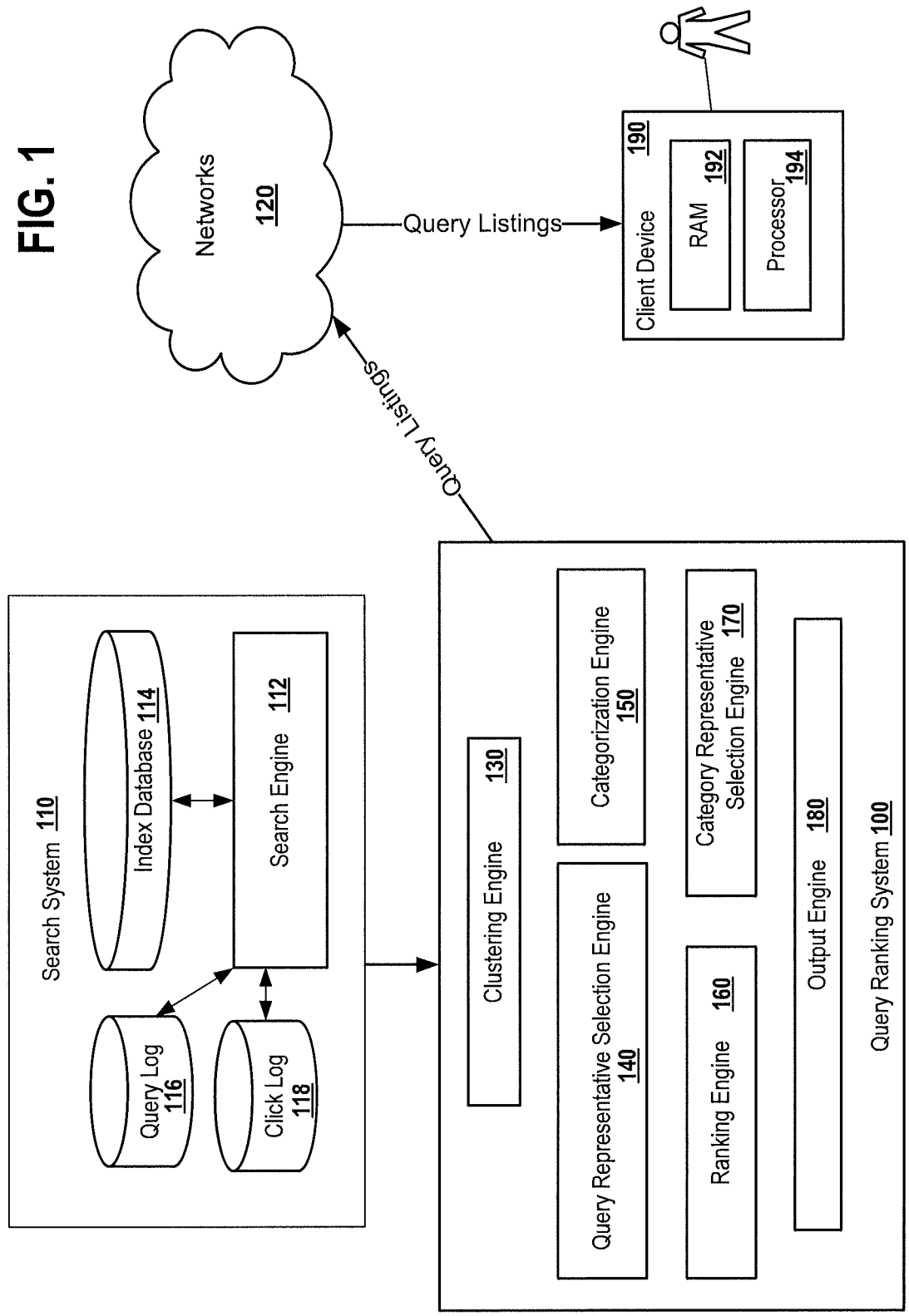
FIG. 1 is a block diagram of an example query ranking system.

This disclosure describes query ranking based on query clustering and categorization. A top rising query and top volume query data service offers data showing fastest rising queries (e.g., Top 100 Rising Queries) and highest volume queries (e.g., Top 100 Most Searched Queries) submitted to one or more search engines over a given period of time. The data presented can be specific to certain geographical regions (e.g., United States, India, Europe, Utah, or San Francisco, etc.). The data can also be specific to particular topical categories (e.g., Entertainment, Travel, Politics, Celebrity, etc.). The top rising query and top volume query listings provided by the top rising query and top volume query data service provide information that can be used by users to identify topics of rising interest and popularity for a given time period or geographical region.

Although ranking of search queries based on their total search volumes or increase in total search volumes are good indicators of trends and interests of a time, the ranking and presentation of ranked search queries can be improved in various aspects to better suit that purpose.

First, query ranking based on search volumes of exact search terms often exhibits redundancy. For example, when the sixth pay commission in India is declared, multiple search queries related to this topic, such as "sixth pay commission," "6th pay commission," "6pc," "sixth pay commission India," "department of personnel and training," and "dopt," can experience a significant surge in search volumes and be listed as separate top rising queries. A listing of redundant queries may provide no more value than a single representative query for the topic would do. Elimination of redundancy in a query listing can leave space for queries targeting other topics of rising interest and improve variety in the listing. Elimination of redundancy is also particularly important for mobile device users due to the limited display area available on a mobile device.

In addition, due to the many alternative query terms users can submit for a particular topic of interest, query ranking based on query volumes of exact search terms often results in omission of search queries that in fact warrant placement on the top rising or top volume query listings. For example, users interested in learning about an American celebrity, Jennifer Lopez, can conduct web searches using "Jennifer Lopez," "J Lo," "Tho," "J.Lo," "J Lopez," "J-Lo" "Lopez," "Bennifer," or various names of her new songs or movies as query terms. Even though overall interest in Jennifer Lopez may be rising, or the overall interest may be high, this interest may not be reflected in the top rising or top volume query listings because individual search volume for each of those queries is not significant enough to ensure its placement on the top rising or top volume query listings.

Furthermore, even if two queries are normally unrelated, they can be associated, during a particular time period, by a news event. For example, immediately following the breaking news about Lehman Brothers filing for bankruptcy, both "bankruptcy" and "Lehman Brothers" can experience a significant surge in search volumes. Prior to the newsbreak, these two queries are unrelated; however, while the news of the bankruptcy is fresh, a significant fraction of the users might enter these two queries targeting the same topic, i.e., bankruptcy of Lehman Brothers. In this scenario, top rising query listings and top volume query listings based solely on search volumes may not include these queries because the increase in individual search volume for each of these two queries may not be significant enough to ensure their placement on the listings.

Therefore, an improved query ranking process is needed to present a diverse set of top rising queries or top volume queries that more accurately reflect the trends and interests of the time.

This specification discloses, in one aspect, a technique for reducing redundancy in top query listings and refining query ranking based on qualities such as relevance, popularity, and freshness of the result documents responsive to the search queries. In some implementations, search queries targeting similar topics are grouped into clusters. A representative query is selected for each cluster. Each cluster is associated with a representative topical category. The clusters are ranked according to the overall popularity of their respective constituent search queries and various qualities of the result documents responsive to those constituent search queries. The ranks can be further adjusted according to the popularity of the clusters' respective representative categories. Then, the representative queries are presented in the order according to the ranks of their respective clusters. The clustering, query-representative selection, categorization, ranking, and presentation of search queries can reduce redundancy. The result query listings are diverse and more accurately reflect the trends and interests of the time.

FIG. 1 is a block diagram of an example query ranking system 100.

In one configuration, the query ranking system 100 communicates with a client device 190 over networks 120 to present search query listings to a user in accordance with techniques disclosed in this specification. The client device 190 includes a RAM 192 and a processor 194.

The example query ranking system 100 includes a clustering engine 130, a query-representative selection engine 140, a categorization engine 150, a category-representative selection engine 160, a ranking engine 170, and an output engine 180.

The clustering engine 130 groups search queries into one or more clusters. The grouping is based on the similarity and relatedness of the topics that are targeted by the search queries. A clustering algorithm can be utilized to group the search queries. A metric used by the clustering algorithm can be based on the uniform resource locators (URLs) of the search results responsive to the search queries. The metric can also be based on any one or any combination of the headings, anchors, and snippets from the result documents responsive to the search queries, as well as other information retrieved about the result documents or the content of the result documents themselves. Furthermore, the metric can also be based on the search terms of the search queries. For example, the length of the longest common subsequence between the search terms of the search queries can be used to determine the similarity and relatedness between the topics targeted by the search queries.

The query-representative selection engine 140 selects a query representative for each query cluster. The selection is based on the relative popularity of each query in the cluster. Query-representative selection can further take into consideration various qualities of the result documents responsive to the search queries. Relevant qualities can include importance, relevance, freshness, and popularity of the result documents.

The categorization engine 150 associates each query in a cluster with one or more topical categories. Once the queries in a cluster are associated with one or more topical categories, a representative category is selected for the entire cluster of queries, for example, from the one or more topical categories.

The ranking engine 160 ranks the query clusters. The cluster ranking is based on the overall popularity of each cluster's constituent search queries. In some implementations, the ranking engine 160 further adjusts the cluster ranking based on various qualities of the result documents responsive to the search queries in each cluster. In some implementations, the ranking engine 160 also adjusts the cluster ranking based on the representative categories selected for each clusters. Each representative category is associated with a level of popularity, and ranks of clusters that are associated with the more popular categories are boosted.

Once the ranking of clusters is completed, the output engine 180 formulates the results to be presented on the client device 190 for a user. Representative queries for the top ranked clusters can be presented in order according to the ranks of their respective clusters (e.g., as top 100 rising queries). There are alternatives, for one of which, representative queries of top-ranked clusters that are associated with a common representative category can be presented in the order according to the ranks of their respective clusters (e.g., as categorized rising queries) under that common category. For another alternative, a limited number of representative queries from each of a few predetermined categories can be presented in the order according to the ranks of their respective clusters (e.g., top 3 rising queries in Entertainment, Science, and Politics) under their respective categories.

The example query ranking system 100 communicates with an example search system 110 for various data needed for the clustering, representative-query selection, categorization, representative-category selection, and ranking of search queries. The example search system 110 includes a search engine 112, an index database 114, a query log 116, and a click log 118.

Query log 116 stores data related to the search queries submitted to the search system 110. Query listings based on search volume or increase in search volume over a given period of time or in geographic region can be obtained based on the data stored in the query log 116. The total search volume or increase in total search volume of the search query during a given time period is indicative of the popularity of a search query. Similarly, the search volume or increase in search volume of search queries associated with the cluster or topical category is indicative of the popularity of a cluster or topical category, respectively.

Search engine 112 performs searches on queries submitted to the search system 110 using an index database 114. The index database 114 can index and store documents available on the web including their uniform resource locators (URL), so that the documents can be quickly identified and retrieved in response to a particular search query. Typically, search results responsive to a search query are ranked and only the top-ranked search results are presented to the user by the search system 110.

Click log 118 stores data related to users' response to the search results presented by the search system 110 in response to search queries submitted by the users. Data stored in click log 118 can include click-through rate, click-through reversion rate, click-through duration, and so on. More information on click-through rate, click-through reversion rate, and click-through duration is provided in discussions with respect to FIG. 4.

Search engine 110 employs a variety of quality indicators to identify the more relevant and responsive result documents to each particular search query. These indicators can include various characteristics of the result documents themselves, the importance and relevance of the result documents as indicated by other documents on the web, and users' response to the result documents as they were previously presented by the search system 110 in response to the particular search query. These quality indicators can be utilized by the query ranking system 100 for the query clustering, query-representative selection, query categorization, category-representative selection, and query ranking processes in the query ranking system 100.

Top rising query listing and top volume query listings obtained from the query ranking system 100 contain only one representative query for each query cluster targeting the same topic. Thus, the resulting query listings exhibit much less redundancy and more diversity than the listings based solely on search volume information. Furthermore, as multiple queries targeting the same topic are grouped into a single cluster and the clusters are ranked against each other, the cluster ranking better reflects the relative popularity of the topics being targeted by the rising search queries. Likewise, as queries are grouped based on the similarity and relatedness of their respective result documents, queries with different search terms but have become popular at the same time due to the same external news event can be grouped in a cluster. Hence, the cluster ranking better reflects the interesting topics of the time. Therefore, the query ranking system 200 can produce top rising or top volume query listings that are diverse and better reflect popular interests of the time.

FIG. 1 provides one example configuration of the query ranking system 100. Each component of the query ranking system 100 can be implemented as separate modules in a computing system, or as one or more integrated modules performing the same set of functions. Input required by each component can be retrieved by the query ranking system 100 from external sources (e.g., the search system 110) or from a unified repository. Each component or module can be implemented as one or more software programs that execute on one or more computing devices. Moreover, there can be fewer or more components than those illustrated.

Figure 2:
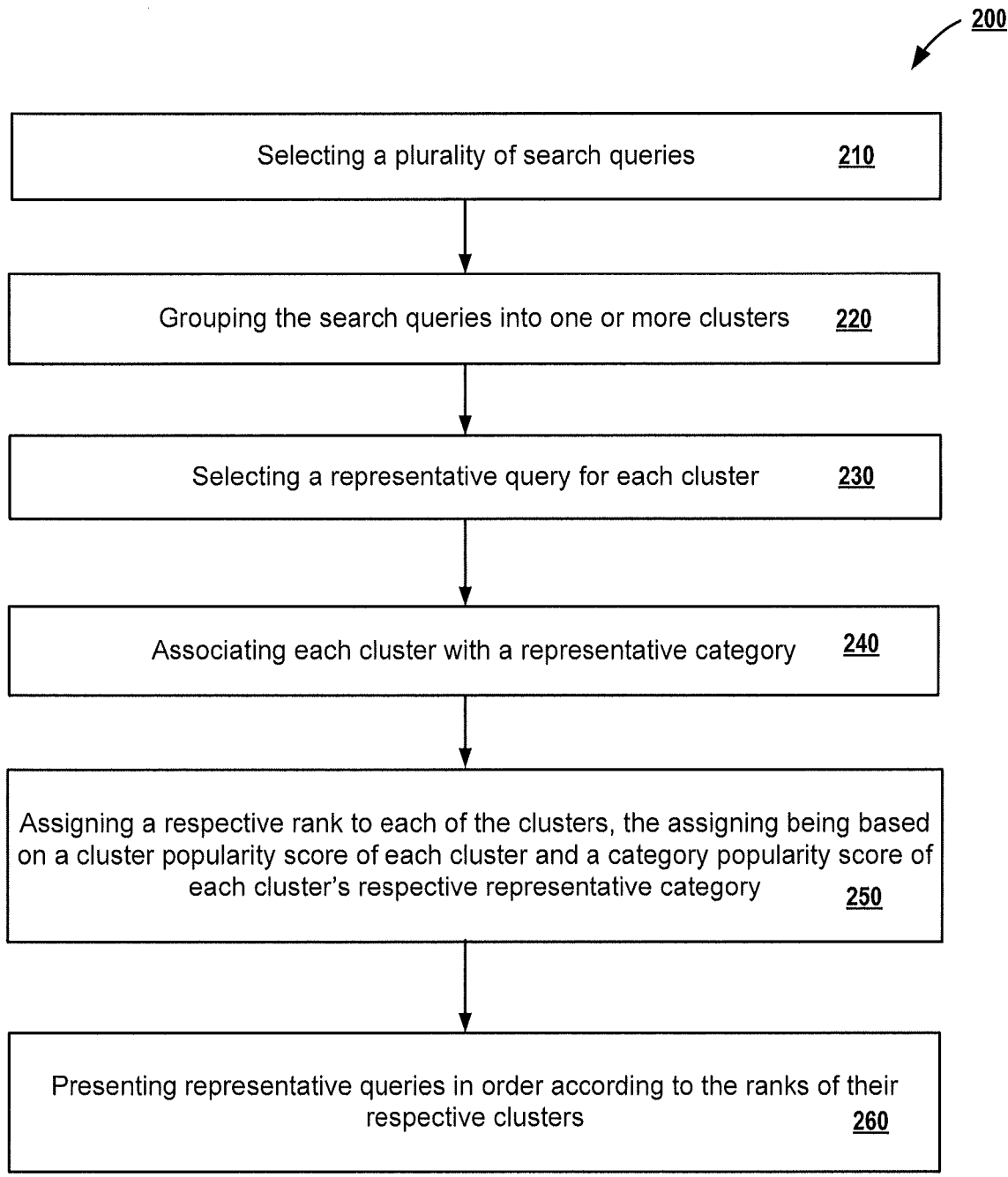
FIG. 2 is a flow diagram of an example query ranking process utilizing query clustering and categorization.

FIG. 2 is a flow diagram of an example query ranking process 200 utilizing query clustering and categorization. The process 200 can be implemented by the query ranking system 100 of FIG. 1.

In various implementations, and as shown in FIG. 2, the process 200 begins when a plurality of search queries are selected (210). The plurality of search queries can be a list of search queries that are already ranked according to their respective total search volume or increase in total search volume over a given period of time. Alternatively, the plurality of search queries can be a group of search queries that satisfy a predetermined minimum total search volume or increase in total search volume thresholds. In some implementations, search volume information, search patterns, or ranking information (such as a popularity score) based on the total search volume or increase in total search volume are also obtained for each of the selected plurality of search queries. The selected queries can be specific to a time period, geographical area, or topical category.

The selected search queries can be those search queries that have been submitted to a search system 100 by users. In some implementations, the search queries also include key words extracted from a set of popular web documents or news stories identified by another program or module, such as a web crawler.

The number of queries identified can depend on the number of queries to be presented to a user. For example, to present the top 100 rising queries, a redundancy factor can be estimated, and an extra number of rising queries based on the redundancy factor can be identified to compensate for the redundant queries that are to be eliminated from the final listing.

In some implementations, the queries are obtained from the search system 110, and are normalized to remove stop words, typos, and irregularities.

After the initial set of search queries are identified (210), the set of search queries are grouped into one or more clusters (220) based on the similarity and relatedness of the topics targeted by each of the search queries. The clustering can be performed by the clustering engine 130 in FIG. 1 using a clustering algorithm. The clustering algorithm can be implemented by the clustering engine 130 or by an external module utilized by the clustering engine 130.

The similarity and relatedness of the topics targeted by the search queries can be deduced from a variety of bases, such as the search terms of the search queries, the URLs of the search results responsive to the search queries, and the anchors, title, key words, snippets, or content of the result documents responsive to the search queries. The clustering algorithm can utilize some or all of this information to group the search queries.

If the grouping is based on the search terms of the search queries, a metric used by the clustering algorithm can be based on the length of the longest common subsequence between the search terms of the search queries. The longest common subsequence of two text strings does not have to be contiguous. For example, the longest common subsequence between two strings "dopt" and "department of personnel and training" is "dopt." In some implementations, a strength function is used to evaluate the similarity between search terms of the search queries. The strength function can be evaluated based on the length of the longest common subsequence between the search terms of the search queries. Queries can be grouped into a common cluster if the strength function has a value within a predetermined threshold range. In some implementations, the strength function also takes into account of the addition and deletion of characters within the longest common subsequence. For example, the strength function can be given a higher value for a continuous longest common sequence than for a segmented (i.e., non-continuous) longest common sequence.

If the grouping is based on the URLs of the search results of search queries, two search queries that produce many search results with identical or similar URLs can be grouped into a common cluster. In some implementations, additional information, such as keywords, anchors, titles, snippets, or other content from the result documents responsive to the search queries can be used to determine whether two search queries target similar or related topics and should be grouped into one cluster.

An example clustering algorithm that is utilized by the clustering engine 130 is the K-medoids algorithm. The K-medoids algorithm partitions a data set into one or more groups while minimizing a squared error, i.e., the distance between each data point to be included in a cluster and a data point designated as the cluster center (medoid). A cluster center (medoid) is defined as the data point in a cluster whose average dissimilarity to all the other data points in the cluster is the minimum. In applying the K-medoids algorithm, each search query and/or its associated search results (URLs and/or other content information) is defined as a data point in the data set that the algorithm partitions. A metric for each search query is calculated based on the query's search terms, URLs of the search results, or content (key words, snippets, titles, etc.) of the result documents responsive to the search query. The optimum number of clusters and the identities of the cluster centers are determined by iterating through all data points in the data set to minimize an aggregated metric for all search queries in all clusters. In some implementations, other partition or clustering algorithms are utilized, examples of which include k-means, agglomerative and divisive hierarchical clustering, and expectation-maximization-based clustering algorithms.

After the plurality of search queries are grouped into one or more clusters, a representative query is selected for each cluster by the representative-query selection engine 140.

In some implementations, when using the K-medoids algorithm for clustering, the medoids in the data set is designated as the representative queries of the clusters. Alternatively, a representative query of a cluster is determined based on the content of the result documents of all search queries within the cluster. In such implementations, the representative query may be a synthetic augmented query suitable for retrieving most of the results documents for all search queries in the cluster.

In some implementations, selection of a representative query of a cluster is based on the relative popularity of the search queries. The popularity of a search query can be based on the total search volume or increase in total search volume of the search query. A query popularity score can be computed based on the search volume information, and a query with the highest popularity score (e.g., fastest increase in search volume or highest total search volume) among all queries in a cluster can be selected as the representative query of the cluster.

In some implementations, the selection of a representative query is also influenced by the relative performance of the queries in retrieving fresh, interesting, and high quality result documents. For example, a query performance score can be obtained for each query in a cluster, where the query performance score is based on one or more quality indicators of the result documents responsive to the search query. The quality indicators are indicative of the importance, authority, relevance, freshness, or quality of the result documents. More details of representative query selection are discussed with respect to FIG. 4.

Once the queries are grouped into one or more clusters, each cluster is associated with a representative topical category (240). In some implementations, each cluster is first associated with one or more categories by the categorization engine 150, and then a representative category is selected for each cluster by the category representative selection engine 170.

In some implementations, the categorization engine 150 utilizes a generic categorization module to associate each query in a cluster with one or more predetermined categories. Examples of predetermined categories include entertainment, movies, celebrities, politics, fashion, science, technology, nature, and so on. More specific categories, such as hairstyle, coin collections, 2007 Winter Olympics, Oprah, and so on, can also be used. Each predetermined category can also have one or more super-categories or sub-categories.

A representative category for each cluster can be selected from all associated categories of search queries within a cluster. Alternatively, only the categories associated with the representative query of a cluster are considered as candidates for the representative category. Alternatively, one or more general categories encompassing the most number of categories associated with a cluster's constituent queries are considered as candidates for the cluster's representative category. Each candidate category association can be assigned a confidence score and the category having the highest confidence score can be chosen as the representative category for the entire cluster. The confidence score of a category association is a measure of how accurately a search query and its result documents fit within a category.

In some implementations, the representative category for a cluster is determined using the K-nearest neighbor algorithm. The K-nearest neighbor algorithm computes a metric between each data point in a cluster and k sample data points in a candidate category. A candidate category is chosen as the representative category for the cluster if it minimizes the aggregated metric between all search queries in the cluster and the k sample data points in the candidate category. A metric between a search query and the K sample data points in a candidate category can be based on a confidence score for the association between the search query and the candidate category. More details on associating each cluster with a representative category are provided with respect to FIG. 5.

After the queries are clustered, a rank is assigned to each cluster based on the relative popularity of the clusters and the relative popularity of the representative category associated with the clusters (250). In some implementations, a cluster popularity score is assigned to each cluster, and a category popularity score is assigned to each representative category. The ranking of the clusters can be performed by the ranking engine 160 in FIG. 1.

In some implementations, the ranks of the clusters are adjusted based on the relative performance of the respective constituent search queries or representative queries of the clusters in retrieving fresh, interesting, and high quality results. For example, a cluster performance score can be obtained for each cluster. The cluster performance score for a cluster can be based on the query performance scores of all queries in the cluster. Alternatively, the cluster performance score for a cluster can be based on the query performance score of the representative query of the cluster. The query performance score is based on one or more quality indicators of the result documents responsive to the search query. The quality indicators are indicative of the importance, authority, relevance, freshness, or quality of the result documents. More details on cluster ranking and cluster ranking adjustments are found in discussions with respect to FIG. 6.

Once a rank is assigned to each of the clusters (250) and a representative query is selected for each cluster (230), the representative queries (or a subset of the representative queries) are presented to the user in order according to the ranks of their respective clusters (260). By presenting the representative queries of the clusters rather than all the search queries in the clusters, redundancy in the resulting list of search queries is reduced. Furthermore, by grouping similar and related search queries based on the search terms, URLs of the search results, or content of the result documents, the list of representative queries more accurately reflects the trendy topics that people are targeting using searches than the query listings based solely on search volume information do. In addition, since the ranks of the clusters are adjusted based on the popularity of their respective representative categories and the relative performance of their respective constituent search queries in retrieving fresh, interesting, relevant, and high quality results documents, representative queries of high-ranking clusters are more likely to retrieve suitable content that appeal to popular interests of the users.

In some implementations, the output is formulated according to the capabilities of the client device 190. A client device 190 can also specify the number and format of the top rising queries or top volume queries to be presented. For example, on a mobile device having a small display, only the top 20 queries is presented, while on a personal computer with a regular-sized display, the top 100 queries can be presented. In some implementations, other peripheral information such as search statistics, advertisements, and news links, and so on can also be presented along with the lists of search queries. On a mobile device, advertisements or related graphs for search patterns and statistics can be presented as hyperlinks, while on a computer with a regular-sized display, advertisements related to top ranked queries can be displayed alongside graphs showing search patterns and statistics.

In some implementations, the output presented are top rising queries or top volume queries with reduced redundancy and with ranks adjusted to better reflect their relative popularity and ability to retrieve relevant, fresh, and high quality result documents. The output listing includes one representative query for each cluster and the representative queries are presented in order according to the ranks of their respective clusters.

In some implementations, the output presented is a categorized top rising query listing or top volume query listing. Representative queries for all clusters associated with a common representative category are presented under that common representative category. The categories are presented in the order of their relative popularity and within each category, the representative queries are presented in the order according to the ranks of their respective clusters. The client device 190 can specify the categories and the number of categories to be presented. Alternatively, the query ranking system 100 can store a list of most popular categories, and only present representative queries associated with those most popular categories. In some implementations, if a user specifies certain categories for presentation, then only representative queries of those clusters that are associated with the specified categories are presented. In some implementations, only categories associated with the few highest-ranked query clusters are presented.

In some implementations, only a predetermined number of representative queries are presented under each category. For example, for the top 100 rising queries, if eighty belong to one category, and two belong to each of the five other categories, and if the number of queries presented under each category is limited to two, then only twelve queries will be presented, with two belonging to the first category and two belonging to each of the other five categories. This implementation improves the variety of queries presented.

In some implementations, filters are used to create query listings specific to a time period, geographical area, or topical category, if the initial listing encompasses query listings for a longer time period, wider geographical area, or more generalized topical categories.

Figure 3:
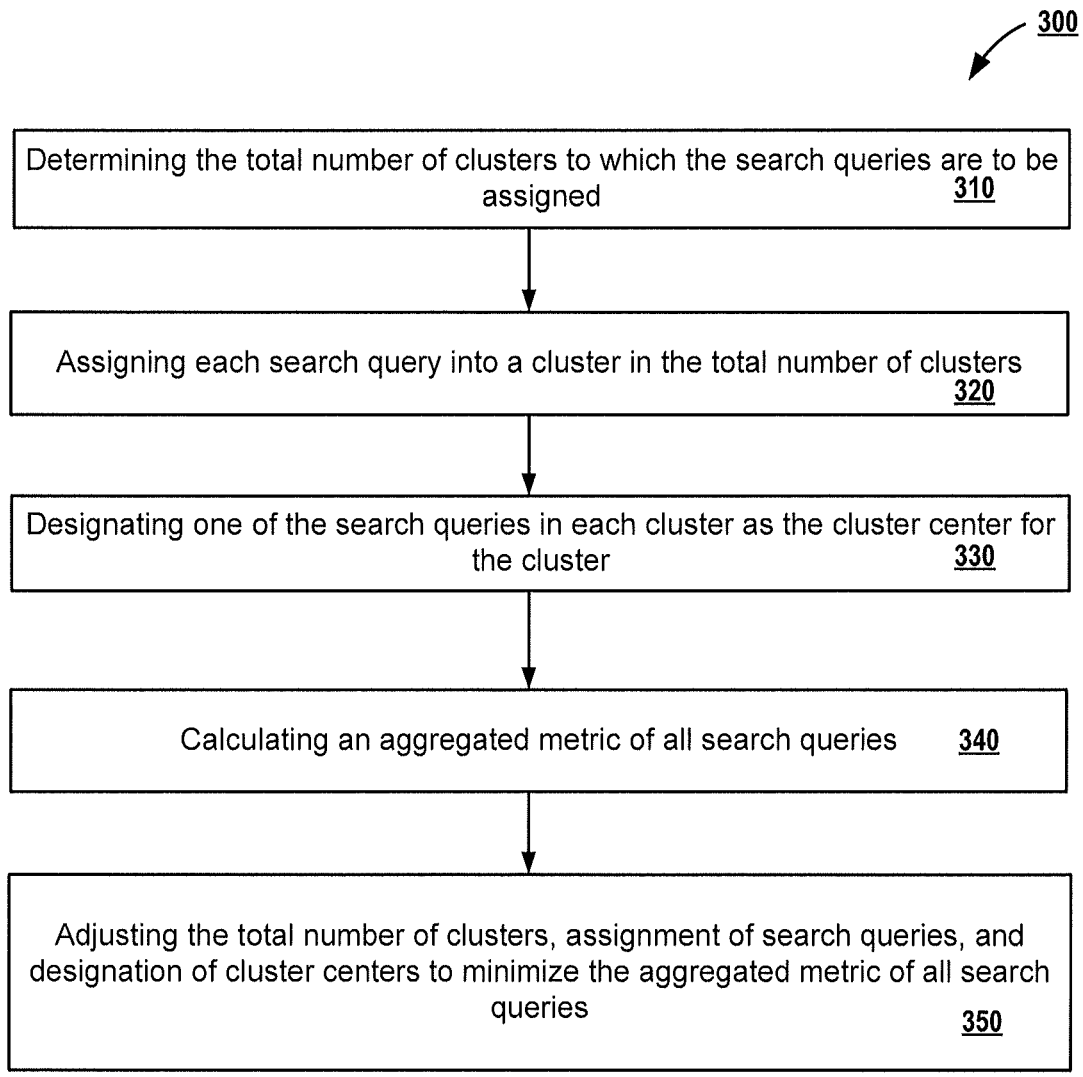
FIG. 3 is a flow diagram of an example query clustering process.

FIG. 3 illustrates an example process for implementing the K-medoids algorithm for clustering the search queries. Similarly, other clustering algorithms, such as k-means, agglomerative and divisive Hierarchical Clustering, and expectation-maximization-based clustering algorithms can be implemented.

The process for clustering the search queries begins after a plurality of search queries have been selected (310). These plurality of search queries define the data points to be clustered. First, a total number of clusters are determined (320), and each of the plurality of search queries is assigned to a cluster in the total number of clusters (330). When all the search queries are assigned to a cluster, one of the search queries in each cluster is designated as the cluster center (or medoid) for the cluster (340). An aggregated metric is computed for all search queries (350). A metric for a search query is a measure of the dissimilarity between the search query and the cluster center of the cluster to which the search query has been assigned. Then, the total number of clusters, the assignment of search queries to each clusters, and the designation of cluster centers for the clusters are adjusted to minimize the aggregated metric of all search queries (360). The total number of clusters, query assignments into the clusters, and the identity of cluster centers are finalized when the aggregated metric is minimized.

In some implementations, the cluster center (or medoid) is a synthetic augmented query that is not present in the plurality of search queries, but performs well in retrieving most of the result documents responsive for all search queries in the cluster.

A metric for a search query is a measure of the dissimilarity or similarity between the search query and the cluster center of the cluster to which the search query has been assigned. The dissimilarity/similarity between a pair of search queries can be measured based on the search terms of the pair of search queries, the URLs of the search results responsive to pair of search queries, or titles, key words, snippets, or contents of the result documents responsive to the pair of search queries.

In some implementations, if the metric is based on one or more of the search terms, URLs of the search results, or titles, snippets, or content of the result documents, the example clustering process further includes identifying the one or more of the search terms, result URLs, and the result documents needed to calculate the metric for the search queries.

Figure 4:
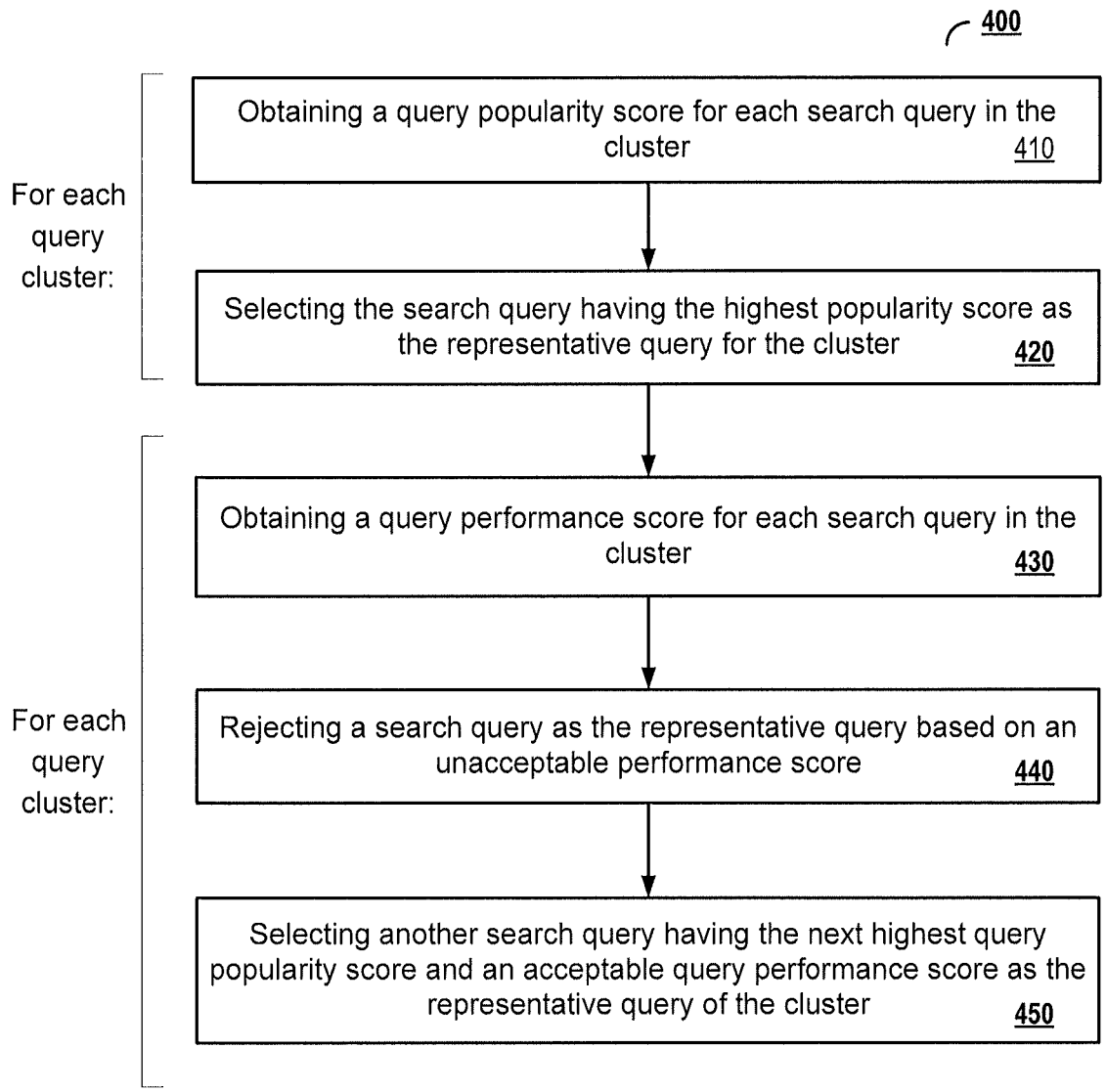
FIG. 4 is a flow diagram of an example representative-query selection process.

FIG. 4 illustrates an example representative query selection process 400. The example representative query selection process begins when the plurality of search queries have been grouped into clusters (220). A representative query is selected for each of the clusters. To select the representative query for a cluster, a popularity score is obtained for each search query assigned to the cluster (410). A search query having the highest popularity score is selected as the representative query for the cluster (420). The popularity score of a query can be calculated based on the total search volume or increase in total search volume of the query. A higher popularity score is given to a search query having a higher total search volume or faster increase in total search volume.

The selection of representative query can also take into consideration of the performance of the search queries in retrieving relevant, fresh, and high quality result documents. A performance score of a search query can be calculated based on a variety of quality indicators for the result documents responsive to search query. The quality indicators are indicative of the importance, authority, relevance, freshness, and/or quality of the result documents.

In some implementations, the query performance score only comes into play in representative query selection if the query performance score is outside of an acceptable range. In such implementations, a query performance score is obtained for each search query in the cluster (430). A search query is rejected as the representative query if it has an unacceptable performance score (440). Another search query having the next highest popularity score and an acceptable performance score is selected as the representative query for the cluster (450) instead.

In some implementations, only search queries having an acceptable performance score is considered as a candidate for representative query, and among those candidates, the search query having the highest popularity score is selected as the representative query for the cluster.

In some implementations, the query performance score and the query popularity score are given different weights, and a representative query is selected based on a combined score of both popularity and performance.

The performance score of a search query can be based on one or more quality indicators of result documents responsive to the search query. Some quality indicators include page rank, click-through rate, click-through duration, and click-through reversion rate. These quality indicators can be obtained from the search engine 112, the index database 114, the query log 116, and the click log 118. These quality indicators can be used to assess the importance, authority, relevance, and freshness of a query's respective result documents.

A page rank is a measure of the importance of a particular webpage as indicated by other webpages that link to the particular webpage. For example, a page rank can be a numerical weight assigned to each document within a hyper-linked set of documents, such as the World Wide Web, with the purpose of "measuring" the documents' relative importance within the set. The page rank of a given webpage can be computed based on how many other webpages link to the given webpage and what kind of page ranks the other webpages have. A higher page rank indicates that more webpages link to a given webpage and the webpages linking to the given webpage also have high page ranks. In some implementations, other scores or methods for calculating relative importance or authority of webpages are used in computing the query performance score.

A very high page rank tends to indicate an authoritative source because authoritative sources often have many other authoritative sources linking to it. If the top search results of a query have very high page ranks, it is likely that the query targets an authoritative source and rather than a hot or trendy topic. Thus, even if such a query falls within a cluster of search queries targeting similar or related topics and even if the query has a high popularity score, the query still may not be suitable as the representative query for the cluster. For example, the top result documents for two related queries, "Wikipedia" and "wiki," all have very high page ranks. The reason for such high page ranks is that the top results for these two queries are various official portals for the well-known free online encyclopedia service, Wikipedia, and a gigantic amount of webpages link to these portals as an authoritative reference source. The ultra high page ranks indicate that the two queries target an authoritative source rather than a trendy topic. Another possibility for an ultra high page rank is that many webpages link to the result page because the result page has been in existence for a long period of time, and thus making it unlikely to be trendy or fresh. Therefore, in some implementations, queries whose top result documents have ultra high page ranks are assigned an unacceptable performance score and are rejected from being selected a representative query.

A page rank for a result webpage is also an indicator of quality for the result webpage. If the top search results of a search query have very low page ranks, it is likely that the content of the result webpages are of low quality. Low page ranks indicate that the result webpages are either about obscure topics or users have had bad experiences with their content, and refuse to create webpages linking to them. Thus, in order to present queries that would lead to high quality content appealing to popular interest, in some implementations, an unacceptable performance score is given to a search query leading to results with very low page ranks. The search query having the unacceptable performance score is rejected from being selected as the representative query of a cluster, even if the query has the highest popularity score.

A click-through rate for a set of search results measures the fraction of search results that are actually clicked on by users among the set of search results presented to the users. Alternatively, a click-through rate for a particular search result measures the fraction of times that a search result is actually clicked on by users out of the total number of times it is presented. In either case, a higher click-through rate likely indicates better relevance and popular appeal of the result documents. A high click-through rate also indicates a well-formed and effective search query. Similarly, a low click-through rate likely indicates irrelevance and obscurity of the search results, or a poorly formed and ineffective search query. Thus, in order to present queries that would lead to content appealing to popular interest, an unacceptable performance score can be assigned to a search query leading to results with very low click-through rates. The search query with the unacceptable performance score can be rejected from being selected as the representative query of a cluster, even if the search query has the highest popularity score.

Click-through duration for the top search results of a search query is also an indicator of quality, relevance, and popular appeal. Long click-through duration occurs when a user, after clicking on a search result, dwells on the landing page of the search result or clicks on additional links that are present on the landing page. The long click-through duration signals that the query identified information that the user deemed to be interesting, as the user either spent a certain amount of time on the landing page or found additional items of interest on the landing page.

In contrast, a click-through reversion occurs when a user, after clicking on a search result and being provided a landing page, quickly returns to the search results page from the landing page. A click-through reversion signals that the query did not identify information that the user deemed to be interesting, as the user quickly returned to the search results page.

In some implementations, one or more of the above-mentioned quality indicators are used to compute the performance score for a search query. For example, a search query having result documents with high click-through rates, many long clicks (i.e., clicks with long click-through durations), and few click-through reversions is given a high performance score. Conversely, a search query having result documents with low click-through-rates, few long clicks, and many click-through reversions is given a low performance score. In some implementations, each quality indicator is given a relative weight in calculating the query performance score. The above-mentioned quality indicators are not an exhaustive list of quality indicators; other quality indicators can also be used.

In some implementations, a performance threshold indicative of a performance level is applied during the representative-query selection process. The performance threshold ensures that only those queries having performance scores meeting or exceeding a performance level are selected as representative queries. The performance threshold can be determined by setting threshold values for each of the quality indicators used to compute the performance scores, and an unacceptable performance score is a performance score based on at least one unacceptable quality indicator value. Threshold values for page rank, click-through rate, click-through duration, and click-through reversion rate can be determined based on statistic models of search results in a search system. For example, the page ranks, click-through rates, click-through durations, and click-through reversion rates for result documents of a large set of search queries can be analyzed, and a value distribution is obtained for each of these quality indicators. The threshold values for each of these quality indicators can be determined based on the value distributions (such as by using values at one or more standard deviations from the mean values).

In some implementations, synthetic augmented queries are created by analyzing the search results of all queries in a cluster, and chosen as the representative query of the cluster. Text, titles, key words, snippets, and/or other descriptive data of the result documents can be used to generate an augmented query that would perform well in obtaining most of the result documents targeted by the queries in the cluster. In some implementations, a synthetic augmented query is selected as the representative query for a cluster only when queries in the cluster all have performance scores below an acceptable threshold value.

In some implementations, where a cluster comprises only one search query, then the only search query is the chosen as the representative search query for the cluster. This scenario sometimes accounts for most of the query clusters in the set of search queries being ranked since redundancy only occurs for a limited number of clusters.

Figure 5:
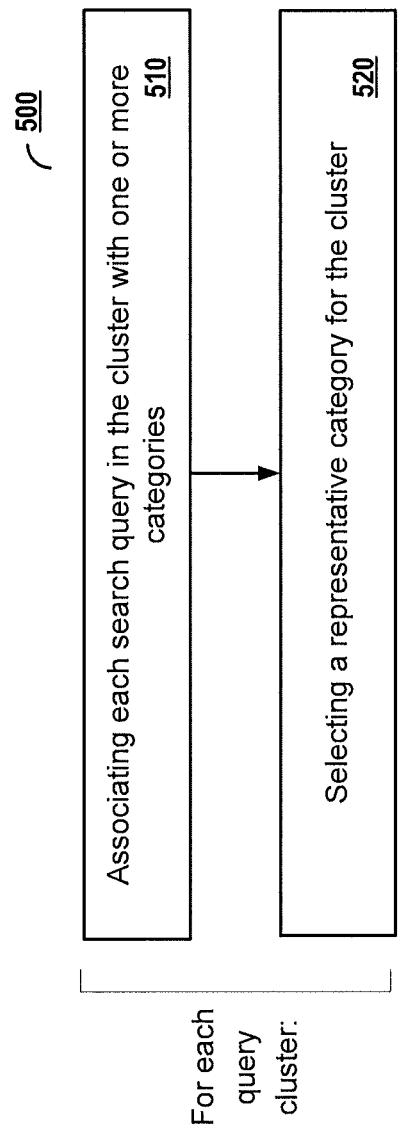
FIG. 5 is a flow diagram of an example cluster categorization process.

FIG. 5 illustrates an example process 500 for associating each cluster with a representative category. The process for associating each cluster with a representative category begins after the plurality of search queries have been grouped into one or more clusters. For each cluster, each search query in the cluster is associated with one or more topical categories (510). Then a representative category is selected for each cluster based on the category associations of the cluster's constituent search queries (520).

In some implementations, a generic categorization module is used to associate each search query with a number of predetermined categories. The category association for each search query can be based on a number of top search results for each search query. For example, the URLs of the search results can be used as input for the generic categorization module. In addition, keywords, titles, snippets, and other content of the result documents can also be used as input for the generic categorization module.

In some implementations, a confidence score is assigned to each category association to denote the accuracy of the category association. For example, a single search query, such as "sixth pay commission," can be associated with a number of categories, such as /Society/Government & Regulatory Bodies, /Local/Regional Content/Central & South Asia, and /Local/Jobs. Each of these category associations can be accompanied by a confidence score as determined by the generic categorization module. For example, the three categories associated with "sixth pay commission,"/Society/Government & Regulatory Bodies, /Local/Regional Content/Central & South Asia, and /Local/Jobs, each receives a respective confidence score of 0.4376, 0.2858, and 0.2766. If a search query is only associated with a single category, the confidence score for the category association is unity, otherwise, the confidence scores sum up to unity.

When choosing the representative category for a cluster, the generic categorization module can implement a K-nearest neighbor algorithm. When applying the K-nearest neighbor algorithm, the confidence scores for category associations can be used as input to compute the distance metrics used in the K-nearest neighbor algorithm. The candidate categories for a cluster can be based on all categories associated with the search queries in the cluster. In such implementations, the K-nearest neighbor algorithm chooses the category that is associated with the most number of queries in the cluster as the cluster's representative category. Alternatively, the representative category of a cluster can also be a general category that includes most categories associated with the queries in the cluster. In some implementations, other classification algorithms can be used to find the representative category for each cluster.

Figure 6:
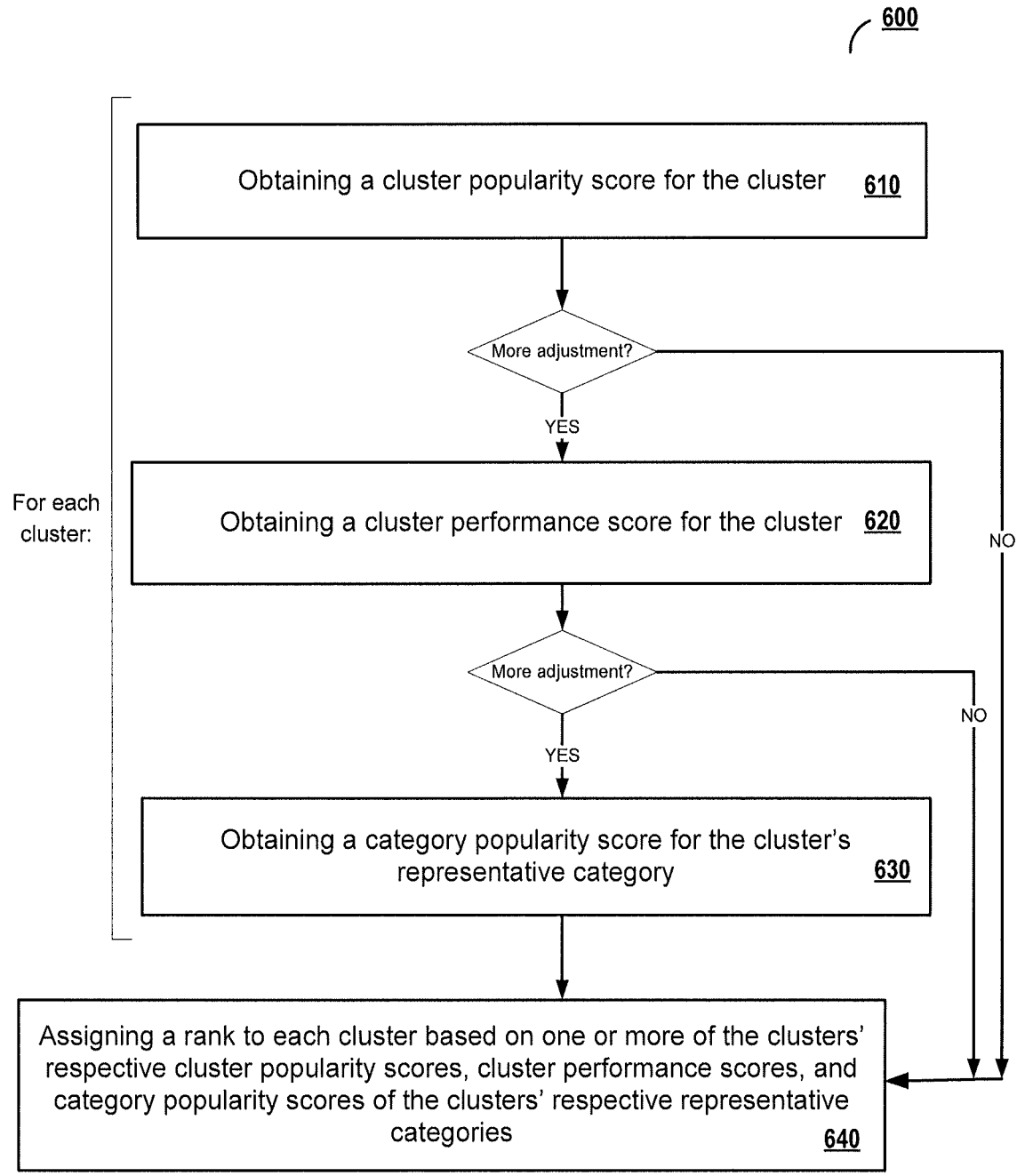
FIG. 6 is a flow diagram of an example cluster ranking process.

FIG. 6 shows an example process 600 for ranking the query clusters based on one or more of the clusters' respective cluster popularity scores, cluster performance scores, and category popularity scores of the clusters' respective representative categories (640).

The popularity score of a cluster (i.e., the cluster popularity score) is calculated based on the query popularity scores of all search queries within the cluster. For each cluster, query popularity scores are obtained for all search queries within the cluster. Then, a cluster popularity score is computed based on the query popularity scores (610). The query popularity scores can be retrieved from the search system or computed based on the search volume information retrieved from the search system. In some implementations, the cluster popularity score for a cluster is computed by aggregating or averaging the popularity scores of all search queries in the cluster. When the clusters are ranked according to the aggregated popularity scores of all search queries in a cluster, clusters having a large number of redundant queries receive a higher rank, reflecting the overall popularity of the topic targeted by the entire cluster. In some implementations, the cluster popularity score is computed directly from the search volume information of the cluster's constituent queries, rather than from the query popularity scores.

In some implementations, once the clusters are ranked according to their cluster popularity scores, the ranks are further adjusted in light of the query performance scores of the clusters' respective constituent search queries. First, the query performance scores are obtained for each search query in a cluster. Then, a cluster performance score is computed based on the query performance scores of the cluster's constituent search queries (620). In some implementations, a cluster performance scores is computed directly from the quality indicators of the result documents for the cluster's constituent queries. In some implementations, the cluster performance score of a cluster is taken to be the same as the query performance score of the representative query of the cluster.

A cluster performance score can be used to boost or demote the rank of a cluster. For example, if many queries within a given cluster have search results with very high page ranks, it is likely that the entire cluster of queries targets an authoritative source, and is less likely to lead to a popular or trendy topic. Thus, the cluster performance score of this cluster is likely lowered by the very high page ranks, and the rank of the cluster is likely demoted. Alternatively, if many queries within a given cluster have search results with very low page ranks, it is likely that the cluster as a whole leads to content of low quality. Thus, the cluster performance score for the given cluster is likely lowered by the page ranks, and the rank of the cluster is likely demoted. Like page ranks, other quality indicators may also raise or lower the cluster performance score of a cluster if many queries have search results showing the same kind of quality behavior. For example, low page ranks, low click-through rates, short click-through durations, or high click-through reversion rates can lower a cluster performance score and lower a cluster's rank. Similarly, high page ranks below a threshold, high click-through rates, long click-through durations, and low click-through reversion rates can improve a cluster performance score and boost a cluster's rank.

In some implementations, the weight given to each quality indicator is adjusted to achieve better ranking results. In some implementations, the cluster performance score only comes into play in ranking clusters if the cluster performance score is outside a specified acceptable range. For example, a cluster's rank can be boosted only when the cluster's performance score is above a threshold value. For another example, a cluster's rank can be boosted only if a quality indicator used to calculate the cluster performance score is outside a specified range.

In some implementations, another quality indicator is used to compute the cluster performance score for a cluster or simply used to boost a cluster's rank. The quality indicator can be called a "freshness" indicator. For example, by analyzing the search results of a query, it can be determined if many of the search results are from a search engine index that is frequently updated and has high importance. If a query has a large number of search results from such an index, then it is likely that this query targets content that is frequently updated and has high importance. An example index that is updated frequently and has high importance is a news index. If a query produces many search results that are webpages of news portals, then it is likely that the query targets a fresh and newsworthy topic. The update frequency and importance of the index from which most search results are identified can be used as a "freshness" indicator for the search query. The reason that a search index is updated frequently is that its content changes often. High importance means the content is frequently visited by users. High importance also indicates that people visit pages on this index directly rather than land from links on other webpages. In some implementations, a cluster performance score of a cluster is based on the freshness indicators of its constituent search queries or representative query.

In some implementations, the cluster ranking is further adjusted by the relative popularity of the clusters' respective representative categories. A category popularity score for each cluster's respective representative category is obtained (630). The category popularity score of each category can be predetermined by the search system 110, or computed using information from the query log 116 and the click log 118. For example, the popularity score for a category (i.e., category popularity score) can be based on the total volume or the increase in total volume of web traffic related to the category. In some implementations, the popularity score of a category is based on the number and size of the clusters that have been associated with the category, the larger the number and size of the clusters, the higher the popularity score for the category. In some implementations, the popularity score is based on the categories specified in a user profile (e.g., the user's favorite categories).

For example, entertainment is a very popular category, clusters with entertainment as their representative categories can be boosted in ranks over clusters with higher cluster popularity scores. For another example, if a user's profile specifies that he or she is interested in the technology category, and not in the entertainment category, clusters with entertainment as their representative categories no longer receive the boost, while clusters with technology as their representative categories can receive a boost in ranks over clusters with higher cluster popularity scores. In some implementations, the amount of boost a cluster receives may not be sufficient to overcome the large difference in popularity scores between the clusters, and in that case, the relative ranks between the clusters do not change.

FIG. 7A-7G is an example process for the clustering, representative selection, categorization, and ranking processes described above.

FIG. 7A shows a plurality of queries received by a query ranking system which exhibit certain amount of redundancy. FIG. 7B shows the clusters formed by the plurality of queries. FIG. 7C shows a representative query being selected for each of the clusters. FIG. 7D shows the clusters being ranked according to their relative popularity. FIG. 7E shows each cluster being associated with a representative category. FIG. 7F shows the cluster ranks being adjusted based on the relative popularity of their representative categories. FIG. 7G shows the final list of queries presented to a user, with all redundancies removed, and with ranks reflecting their popular appeals.

Referring to FIG. 7A, first, a set of rising queries is obtained from a query server (the order of a query in the set indicates its relative popularity score):
1. six pay commission,
2. 6 pc,
3. shilpa shetty news,
4. dopt,
5. department of personnel and training,
6. raj kundra.
7. . . .
8. . . .

These queries can also be unranked at this point, and a popularity score can be subsequently obtained using search volume information obtained from the query log.

Referring to FIG. 7B, after the clustering step, three clusters of queries are identified:
<sixth pay commission, 6 pc, dopt, department of personnel and training>
<shilpa shetty news, raj kundra>
<. . . , . . . >

Referring to FIG. 7C, after the clusters have been identified, the step for determining a cluster representative query is performed. The cluster representatives are selected from the queries in each cluster based on their popularity score as well as their performance scores, where the performance scores can be based on one or more quality indicators, such as page ranks or click-through rates, etc. In this example, even though "shilpa shetty news" has a higher popularity score, it is not selected as the representative query for its respective cluster because it has a very high page rank, and its search results are more likely to be authoritative than fresh and interesting.

After representative queries are selected, the clusters with their representative queries (in brackets) are as follows:
<{sixth pay commission}, 6 pc, dopt, department of personnel and training>
<shilpa shetty news, {raj kundra}>
<{ . . . }, . . . >

Referring to FIG. 7D, at the same time as or after the representative query of each cluster is selected, the clusters are ranked based on the popularity scores and performance scores (not shown) of their respective constituent search queries (or the clusters' respective cluster popularity scores and cluster performance scores). Optionally, this ranking step can also be performed after the following categorization step is completed. If cluster ranking is performed at this point, the order of the clusters is as follows:
1. <{sixth pay commission}, 6 pc, dopt, department of personnel and training>
2. <shilpa shetty news, {raj kundra}>
3. <{ . . . }, . . . >

Referring to FIG. 7E, the step for associating each cluster with a representative category is performed. In detail, each query in a cluster is associated with one or more predetermined categories. Each query categorization is also associated with a confidence score. For example:

The query "six pay commission" is associated with the following categories:
Confidence Category
0.4376 /Society/Government & Regulatory Bodies/
0.2858 /Local/Regional Content/Central & South Asia/
0.2766 /Local/Jobs/

The query "shilpa shetty news" is associated with the following categories:
Confidence Category
0.4135 /Entertainment/Movies/Bollywood & Hollywood/
0.3978 /Entertainment/Celebrities/
0.1887 /Entertainment/TV/TV Programs/

The query "raj kundra" is associated with the following categories:
Confidence Category
0.7519 /Lifestyles/Ethic & Identity Groups/East Indian/
0.2481 /Local/Regional Content/Central & South Asia/and so on . . . .

Based on these category associations, and their respective confidence scores, a representative category is selected for each cluster (e.g., using the K-nearest neighbor algorithm). In this example, Entertainment is selected as the representative category for the "raj kundra" cluster and the " . . . " cluster, and Society is selected as the representative category for the "sixth pay commission" cluster (see FIG. 7E).

Referring to FIG. 7F, at this point, the ranks of the clusters are adjusted based on the category popularity scores of the clusters' representative categories. The "raj kundra" cluster is boosted above the "sixth pay commission" cluster because Entertainment is a much more popular category than the Society category. Thus, re-ranking of the clusters shows the clusters in the following order:
1. <shilpa shetty news, {raj kundra}>
2. <{ . . . }, . . . >
3. <{sixth pay commission}, 6 pc, dopt, department of personnel and training>

Referring to FIG. 7G, when presenting the top rising queries to users, instead of presenting the original 8 rising queries, only three representative queries are presented, and in the order of their cluster ranks:

I. raj kundra
II. . . .
III. six pay commission

Thus, redundancy is reduced, and the queries presented are more likely to appeal to popular interest.

As another illustration for the output that can be presented to a user, suppose the <. . . , . . . > cluster shown above is in fact <katrina kaif, salman khan, katrina, katrina new movies>, and the categories for katrina kaif are as follows:

Confidence Category
0.6882 /Entertainment/Movies/Bollywood & Hollywood/
0.1663 /Lifestyles/
0.1455 /Internet/Online Goodies/Screen Themes/

Suppose the representative category for this "katrina kaif" cluster is also entertainment, the same as the "raj kundra" cluster, the two clusters associated with entertainment are combined, and representative queries of both clusters are presented under the entertainment category. The order of the two representative queries are based on the ranking of their clusters which is in turn based on their respective cluster popularity scores and cluster performance scores. The output presented to a user is:

I. Entertainment: raj kundra, katrina kaif
II. Society: six pay commission

Within the entertainment category above, the ranking of "raj kundra" is higher than that of "katrina kaif." The reason for this ranking can be a combination of factors, for example, the popularity score for "raj kundra" can be higher; or the page ranks of the results for the query "katrina kaif" are much higher than the page ranks for the results for the query "raj kundra" which makes it more likely authoritative than popular; or the cluster with "raj kundra" as cluster representative has many more results in a news index since "raj kundra" is an entity that often appears in news and blogs.

Figure 8:
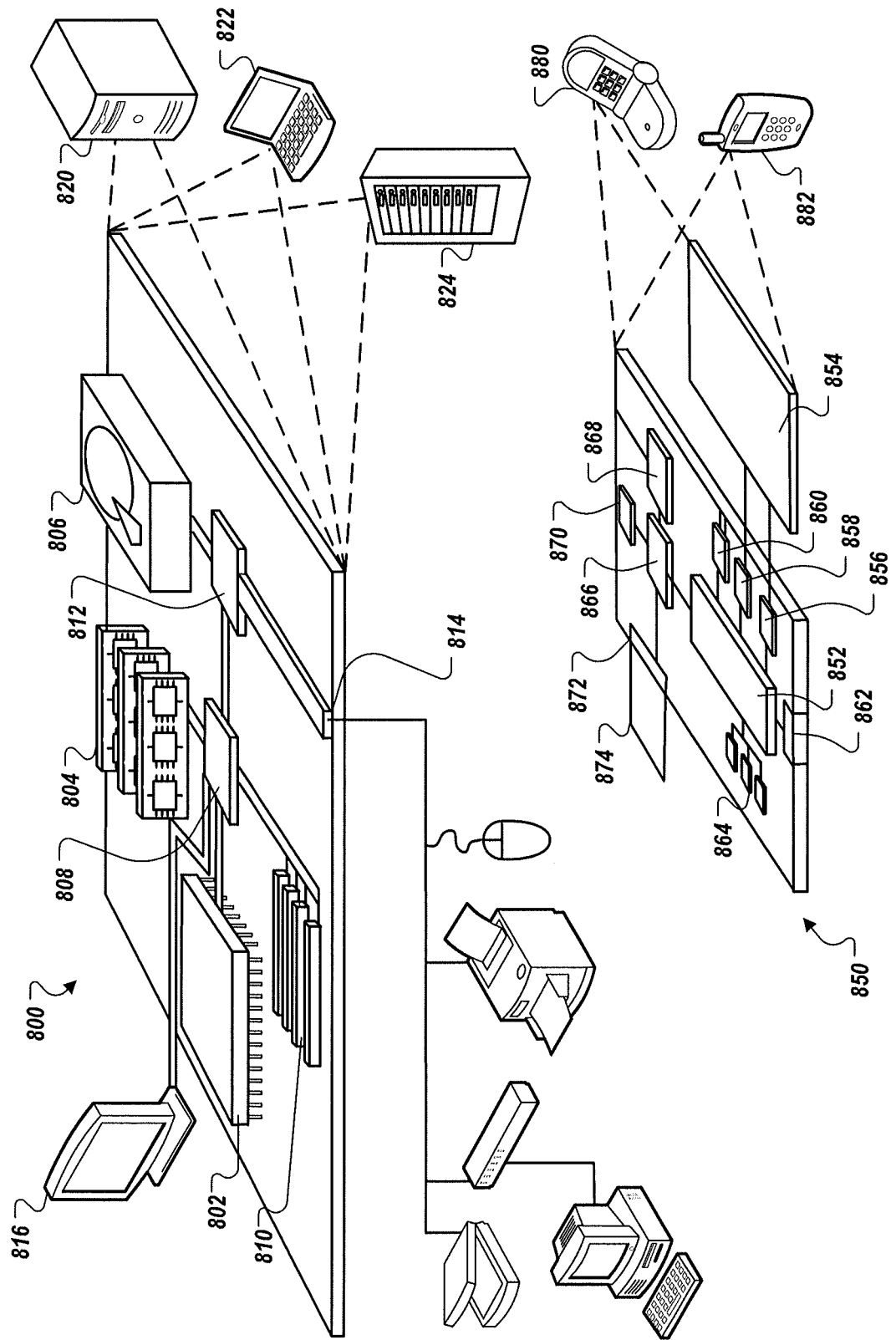
FIG. 8 is a block diagram of two generic computing devices.

FIG. 8 is a block diagram of computing devices 800, 850 that may be used to implement the systems and methods described in this document, as either a client or as a server or plurality of client and servers. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a computer-readable medium. In one implementation, the memory 804 is a volatile memory unit or units. In another implementation, the memory 804 is a non-volatile memory unit or units.

The storage device 806 is capable of providing mass storage for the computing device 800. In one implementation, the storage device 806 is a computer-readable medium. In various different implementations, the storage device 806 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of duties is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can process instructions for execution within the computing device 850, including instructions stored in the memory 864. The processor may also include separate analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD display or an OLED display, or other appropriate display technology. The display interface 856 may comprise appropriate circuitry for driving the display 854 to present graphical and other information to a user. The control interface 1158 may receive commands from a user and convert them for submission to the processor 852. In addition, an external interface 862 may be provide in communication with processor 852, so as to enable near area communication of device 850 with other devices. External interface 862 may provide, for example, for wired communication (e.g., via a docking procedure) or for wireless communication (e.g., via Bluetooth or other such technologies).

The memory 864 stores information within the computing device 850. In one implementation, the memory 864 is a computer-readable medium. In one implementation, the memory 864 is a volatile memory unit or units. In another implementation, the memory 864 is a non-volatile memory unit or units. Expansion memory 874 may also be provided and connected to device 850 through expansion interface 872, which may include, for example, a SIMM card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS receiver module 870 may provide additional wireless data to device 850, which may be used as appropriate by applications running on device 850.

Device 850 may also communication audibly using audio codec 860, which may receive spoken information from a user and convert it to usable digital information. Audio codex 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smartphone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the search systems and methods have been described, it should be recognized that numerous other applications are contemplated. While reference is made to determining hierarchical data associated with a resource determined as a search result, hierarchical data can be associated with a resource identified by other means. For example, hierarchical data can be determined for a resource and associated with that resource, where a visual representation of the hierarchical data can be attached to the resource for display to a user in an email message. The resource may be the result of a request made by a user to customer service support on a web site for specific information included on the web site. Accordingly, other embodiments are within the scope of the following claims.

What is claimed is:

1. A computer-implemented method comprising:
receiving a request to identify trending search queries in a search system;
grouping a plurality of search queries into a plurality of clusters of search queries;
associating each cluster of search queries with a respective representative category;
determining, by one or more computers and for each cluster of search queries, a cluster score based on a cluster performance score or a category popularity score,
wherein the category popularity score of a particular category is a score whose value correlates with the number of clusters associated with the particular category, and
wherein the cluster performance score of a particular cluster is a score whose value correlates with a respective rank of one or more pages that are identified for one or more of search queries that are grouped into the particular cluster;
generating a ranking of the clusters of search queries based on the cluster scores; and
presenting, as a representation of the trending search queries in the search system, information identifying a subset of the clusters of search queries as ranked according to the ranking.

2. The method of claim 1, wherein grouping the plurality of search queries further comprises:
identifying an address associated with each search query; and
grouping the plurality of search queries into a plurality of clusters of search queries based on each search query's respective address.

3. The method of claim 1, wherein grouping the plurality of search queries further comprises:
identifying a set of result documents that a search engine has identified for each search query; and
grouping the plurality of search queries into a plurality of clusters of search queries based on each search query's respective set of result documents.

4. The method of claim 1, wherein each search query in the plurality of search queries has one or more search terms, and wherein grouping the plurality of search queries further comprises:
grouping the plurality of search queries into a plurality of clusters of search queries based on each search query's respective search terms.

5. The method of claim 1, wherein presenting information identifying a subset of the clusters of search queries further comprises:
selecting a representative query from each cluster of search queries; and
presenting the representative queries of the clusters in the subset of the clusters of search queries as ranked according to the cluster ranking.

6. The method of claim 5, wherein selecting a representative query from each cluster of search queries further comprises:
selecting a representative query from each cluster of search queries based on query popularity scores, where the query popularity score for each search query is based on a rate of increase in search volume for the search query or a total search volume for the search query.

7. The method of claim 5, wherein selecting a representative query from each cluster of search queries further comprises:
selecting a representative query from each cluster of search queries based on query performance scores, where the query performance score of each search query is based on a page rank, a click-through rate, a click-through duration, or a click-through reversion rate for a subset of respective result documents responsive to the search query.

8. The method of claim 1, wherein associating each cluster of search queries with a respective representative category further comprises:
for each cluster:
associating each search query in the cluster with one or more categories based on a respective set of result documents responsive to the search query; and
associating the cluster with a respective representative category based on the category associations of the cluster's search queries.

9. The method of claim 1, wherein associating each cluster of search queries with a respective representative category further comprises:
for each cluster:
identifying a category from a plurality of categories that is associated with a greatest number of search queries in the cluster; and
associating the cluster with the identified category.

10. The method of claim 1, wherein presenting information identifying a subset of the clusters of search queries further comprises:
presenting information identifying the subset of the clusters of search queries in order according to the ranks of their respective clusters, wherein the subset of the clusters of search queries are associated with a common representative category.

11. The method of claim 1, wherein the cluster performance score used for determining the cluster score is based on a page rank, a click-through rate, a click-through duration, or a click-through reversion rate of a respective result document responsive to at least one cluster's respective query.

12. The method of claim 1, wherein the category popularity score used for determining the cluster score is based on a total volume of web traffic related to the representative category, an increase in total volume of web traffic related to the representative category, a number of clusters associated with the representative category, or a number of search queries in a plurality of clusters associated with the representative category.

13. The method of claim 1, wherein trending search queries include search queries submitted by users of the search system within a predetermined period of time.

14. The method of claim 1, wherein trending search queries include search queries of a particular category submitted by users of the search system.

15. The method of claim 1, wherein presenting information identifying a subset of the clusters of search queries as ranked according to the ranking further comprises presenting, as a representation of trending search queries in the search system at a particular time when the request was received, information identifying a subset of the clusters of search queries as ranked according to the ranking.

16. A computer-readable medium storing software having thereon instructions, which, when executed by one or more computers, cause the one or more computers to perform operations of:
  receiving a request to identify trending search queries in a search system;
  grouping a plurality of search queries into a plurality of clusters of search queries;
  associating each cluster of search queries with a respective representative category;
  determining, by one or more computers and for each cluster of search queries, a cluster score based on a cluster performance score or a category popularity score,
  wherein the category popularity score of a particular category is a score whose value correlates with the number of clusters associated with the particular category, and
  wherein the cluster performance score of a particular cluster is a score whose value correlates with a respective rank of one or more pages that are identified for one or more of search queries that are grouped into the particular cluster;
  generating a ranking of the clusters of search queries based on the cluster scores; and
  presenting, as a representation of the trending search queries in the search system, information identifying a subset of the clusters of search queries as ranked according to the ranking.

17. The computer-readable medium of claim 16, wherein grouping the plurality of search queries further comprises:
  identifying an address associated with each search query; and
  grouping the plurality of search queries into a plurality of clusters of search queries based on each search query's respective address.

18. The computer-readable medium of claim 16, wherein grouping the plurality of search queries further comprises:
  identifying a set of result documents that a search engine has identified for each search query; and
  grouping the plurality of search queries into a plurality of clusters of search queries based on each search query's respective set of result documents.

19. The computer-readable medium of claim 16, wherein each search query in the plurality of search queries has one or more search terms, and wherein grouping the plurality of search queries further comprises:
  grouping the plurality of search queries into a plurality of clusters of search queries based on each search query's respective search terms.

20. The computer-readable medium of claim 16, wherein presenting information identifying a subset of the clusters of search queries further comprises:
  selecting a representative query from each cluster of search queries; and
  presenting the representative queries of the clusters in the subset of the clusters of search queries as ranked according to the cluster ranking.

21. The computer-readable medium of claim 20, wherein selecting a representative query from each cluster of search queries further comprises:
  selecting a representative query from each cluster of search queries based on query popularity scores, where the query popularity score for each search query is based on a rate of increase in search volume for the search query or a total search volume for the search query.

22. The computer-readable medium of claim 20, wherein selecting a representative query from each cluster of search queries further comprises:
  selecting a representative query from each cluster of search queries based on query performance scores, where the query performance score of each search query is based on a page rank, a click-through rate, a click-through duration, or a click-through reversion rate for a subset of respective result documents responsive to the search query.

23. The computer-readable medium of claim 16, wherein associating each cluster of search queries with a respective representative category further comprises:
  for each cluster:
    associating each search query in the cluster with one or more categories based on a respective set of result documents responsive to the search query; and
    associating the cluster with a respective representative category based on the category associations of the cluster's search queries.

24. The computer-readable medium of claim 16, wherein associating each cluster of search queries with a respective representative category further comprises:
  for each cluster:
    identifying a category from a plurality of categories that is associated with a greatest number of search queries in the cluster; and
    associating the cluster with the identified category.

25. The computer-readable medium of claim 16, wherein presenting information identifying a subset of the clusters of search queries further comprises:
  presenting information identifying the subset of the clusters of search queries in order according to the ranks of their respective clusters, wherein the subset of the clusters of search queries are associated with a common representative category.

26. The computer-readable medium of claim 16, wherein the cluster performance score used for determining the cluster score is based on a page rank, a click-through rate, a click-through duration, or a click-through reversion rate of a respective result document responsive to at least one cluster's respective query.

27. The computer-readable medium of claim 16, wherein the category popularity score used for determining the cluster score is based on a total volume of web traffic related to the representative category, an increase in total volume of web traffic related to the representative category, a number of clusters associated with the representative category, or a number of search queries in a plurality of clusters associated with the representative category.

28. A system comprising:
  one or more computers and one or more storage devices storing instructions that are operable, when executed by the one or more computers, to cause the one or more computers to perform operations comprising:

receiving a request to identify trending search queries in a search system;

grouping a plurality of search queries into a plurality of clusters of search queries;

associating each cluster of search queries with a respective representative category;

determining, by one or more computers and for each cluster of search queries, a cluster score based on a cluster performance score or a category popularity score, wherein the category popularity score of a particular category is a score whose value correlates with the number of clusters associated with the particular category, and wherein the cluster performance score of a particular cluster is a score whose value correlates with a respective rank of one or more pages that are identified for one or more of search queries that are grouped into the particular cluster;

generating a ranking of the clusters of search queries based on the cluster scores; and presenting, as a representation of the trending search queries in the search system, information identifying a subset of the clusters of search queries as ranked according to the ranking.

29. The system of claim 28, wherein grouping the plurality of search queries further comprises:

identifying an address associated with each search query; and grouping the plurality of search queries into a plurality of clusters of search queries based on each search query's respective address.

30. The system of claim 28, wherein grouping the plurality of search queries further comprises:

identifying a set of result documents that a search engine has identified for each search query; and grouping the plurality of search queries into a plurality of clusters of search queries based on each search query's respective set of result documents.

31. The system of claim 28, wherein each search query in the plurality of search queries has one or more search terms, and wherein grouping the plurality of search queries further comprises:

grouping the plurality of search queries into a plurality of clusters of search queries based on each search query's respective search terms.

32. The system of claim 28, wherein presenting information identifying a subset of the clusters of search queries further comprises:

selecting a representative query from each cluster of search queries; and presenting the representative queries of the clusters in the subset of the clusters of search queries as ranked according to the cluster ranking.

33. The system of claim 32, wherein selecting a representative query from each cluster of search queries further comprises:

selecting a representative query from each cluster of search queries based on query popularity scores, where the query popularity score for each search query is based on a rate of increase in search volume for the search query or a total search volume for the search query.

34. The system of claim 32, wherein selecting a representative query from each cluster of search queries further comprises:

selecting a representative query from each cluster of search queries based on query performance scores, where the query performance score of each search query is based on a page rank, a click-through rate, a click-through duration, or a click-through reversion rate for a subset of respective result documents responsive to the search query.

35. The system of claim 28, wherein associating each cluster of search queries with a respective representative category further comprises:

for each cluster:
  associating each search query in the cluster with one or more categories based on a respective set of result documents responsive to the search query; and
  associating the cluster with a respective representative category based on the category associations of the cluster's search queries.

36. The system of claim 28, wherein associating each cluster of search queries with a respective representative category further comprises:

for each cluster:
  identifying a category from a plurality of categories that is associated with a greatest number of search queries in the cluster; and
  associating the cluster with the identified category.

37. The system of claim 28, wherein presenting information identifying a subset of the clusters of search queries further comprises:

presenting information identifying the subset of the clusters of search queries in order according to the ranks of their respective clusters, wherein the subset of the clusters of search queries are associated with a common representative category.

38. The system of claim 28, wherein the cluster performance score used for determining the cluster score is based on a page rank, a click-through rate, a click-through duration, or a click-through reversion rate of a respective result document responsive to at least one cluster's respective query.

39. The system of claim 28, wherein the category popularity score used for determining the cluster score is based on a total volume of web traffic related to the representative category, an increase in total volume of web traffic related to the representative category, a number of clusters associated with the representative category, or a number of search queries in a plurality of clusters associated with the representative category.

* * * * *